(12) United States Patent
Chin (10) Patent No.: US 7,127,244 B2
(45) Date of Patent: Oct. 24, 2006

(54) SYSTEM AND METHOD FOR DELIVERING INCOMING CALLS TO MOBILE UNITS IN BORDER CELLS USING PACKET-BASED LINKS

(75) Inventor: Mary Wonmon Chin, Westmont, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 478 days.

(21) Appl. No.: 10/224,812

(22) Filed: Aug. 21, 2002

(65) Prior Publication Data

US 2004/0198349 A1    Oct. 7, 2004

(51) Int. Cl.
*H04Q 7/20* (2006.01)

(52) U.S. Cl. .................. 455/432.1; 455/432.2; 455/433; 455/439; 455/436; 455/7

(58) Field of Classification Search ............. 455/432.1, 455/432.2, 433, 439, 436, 7
See application file for complete search history.

(56) References Cited

U.S. PATENT DOCUMENTS

| | | | |
|---|---|---|---|
| 6,097,950 A * | 8/2000 | Bertacchi .................. | 455/432.2 |
| 6,108,518 A | 8/2000 | Madour et al. ............. | 455/31.2 |
| 6,285,880 B1 | 9/2001 | Gognon et al. ............. | 455/432 |
| 6,353,607 B1 | 3/2002 | Valentine et al. ........... | 370/349 |
| 6,615,037 B1 * | 9/2003 | Bharatia et al. ............ | 455/417 |
| 6,731,933 B1 * | 5/2004 | McCormick ............. | 455/432.1 |

FOREIGN PATENT DOCUMENTS

| | | |
|---|---|---|
| EP | 0883316 A1 | 12/1998 |
| EP | 1150522 A2 | 10/2001 |

OTHER PUBLICATIONS

U.S. Appl. No. 09/558,613, filed Apr. 26, 2000, Calabrese et al.

\* cited by examiner

*Primary Examiner*—Matthew D. Anderson
*Assistant Examiner*—Sanh Phu
(74) *Attorney, Agent, or Firm*—Steven R. Santema (57) ABSTRACT

A system and method for delivering incoming calls to mobile unit(s) in border cells using packet-based links. An incoming call is received at a serving mobile switching center (SMSC) (204) for a mobile unit (214) in a border cell served by a border mobile switching center (BMSC) (206). The SMSC allocates (420) processing resources for the incoming call using a voice coder/frame selector (218) and designates a data link connection identifier (DLCI) identifying the voice coder resources to be used for the call. The SMSC sends (422) the DLCI to the BMSC and the BMSC assigns traffic channel resources for the call via an attached base station (208). The BMSC provides (424) the DLCI to the base station, causing the base station to establish a packet link between the voice coder and the traffic channel resources. Thereafter, the BMSC rings (426) the mobile unit. Upon the mobile unit answering (430) and the BMSC so informing (432) the SMSC, the SMSC connects the incoming call to the packet link, thereby completing the call path to the mobile unit.

17 Claims, 5 Drawing Sheets

SYSTEM AND METHOD FOR DELIVERING INCOMING CALLS TO MOBILE UNITS IN BORDER CELLS USING PACKET-BASED LINKS

FIELD OF THE INVENTION

This invention relates generally to the field of wireless communication systems and, more particularly, to a system and method that allows mobile units in border cell situations to receive incoming calls using a packet-based link.

BACKGROUND OF THE INVENTION

Border cell situations have existed since the early days of wireless communications. In one border cell scenario, a mobile unit hears a page from one base station and provides a page response to another base station. In another border cell scenario, a mobile unit having registered with one base station moves to another base station without re-registering its new location with the network (or without the network having acknowledged the re-registration) just as a call is being delivered. These scenarios prevent the network from successfully delivering a call to the mobile unit because the network's knowledge of the location of the mobile unit is not up to date. The network expects that the mobile unit is located in the cell where it has last registered but the mobile unit has since moved to a new location (e.g., a border cell) served by a different base station. The net effect of unsuccessful call delivery is a decreased revenue stream for the service operator.

The border cell problem is most exacerbated where the base stations serving the expected location and new location are controlled by different mobile switching centers (MSCs) as would occur, for example, when the mobile unit has roamed between different communication systems. The MSCs serving the expected location and new location are known as the Serving MSC ("SMSC") and the Border MSC ("BMSC"), respectively. Thus far, efforts to overcome the border cell problem have relied upon dedicated voice circuits between neighboring MSCs/systems. For example, the ANSI-41 Standards for Intersystem Operations prescribe the use of dedicated voice circuits between the SMSC and the BMSC for providing an intermediate call path for an incoming call directed to a mobile unit in a border cell. Such a link using dedicated circuits is known as a "circuit-switched" link. The final call setup appears as a call delivery to the SMSC followed by an intersystem "hard" handoff to the BMSC, where voice coder and speech processing resources for the call are established by the BMSC.

A problem that arises is that dedicated voice circuits between neighboring MSCs/systems are relatively expensive for service providers to purchase, install and/or maintain. It would be desirable for service providers to use packet-based links, which are considered to be more efficient than circuit-switched links, to deliver incoming calls to mobile units in border cells. Examples of packet links include asynchronous transfer mode (ATM), frame relay or internet protocol (IP) links. Such packet-based links are pre-existing (or will soon exist) in many networks, as the wireless industry is migrating from traditional, circuit-based switching technology to packet-based switching technology, although they are not currently prescribed for use in border cell situations.

SUMMARY OF THE INVENTION

The system and method embodiments of the present invention provide for delivering incoming calls to mobile unit(s) in border cells using packet-based links, thereby removing the need for service providers to purchase and maintain dedicated voice circuits connecting border cells.

In one embodiment, there is provided a communication system comprising a serving mobile switching center (SMSC), border mobile switching center (BMSC) and packet network linking the SMSC and BMSC. The SMSC is operable to determine, upon receiving an incoming call for a mobile unit, that the mobile unit has roamed outside an area served by the SMSC. The SMSC includes a voice coder adapted for allocating voice processing resources for the incoming call. The BMSC is operable to determine, responsive to a query of the SMSC, that the mobile unit is within an area served by the BMSC and to so inform the SMSC. A packet link is established between the SMSC and BMSC responsive to the SMSC sending a packet address of the voice coder to the BMSC and in turn, the BMSC sending the packet address to a base station that is in communication with the mobile unit.

In another embodiment, there is provided a method for connecting an incoming call to a mobile unit at a border cell. An incoming call is received for a mobile unit at a SMSC, and a determination is made that the mobile unit is being served by a BMSC. Processing resources for the incoming call are allocated at the SMSC and traffic channel resources for the mobile unit are assigned at the BMSC. A packet link is established between the SMSC allocated resources and the BMSC allocated resources and the incoming call is connected to the packet link.

In still another embodiment, there is provided a method for setting up an incoming call directed to a mobile unit, wherein the mobile unit has roamed from a first base station coverage area, associated with a base station controlled by a serving mobile switching center (SMSC), to a border base station coverage area, associated with a base station controlled by a border mobile switching center (BMSC). An intersystem setup request message is sent from the SMSC to the BMSC. The intersystem setup request message includes a data link connection identifier (DLCI) indicating a packet address of voice coder resources assigned by the SMSC for the incoming call. The DLCI is sent to the base station controlled by the BMSC, causing the base station to establish a packet link between the packet address of the voice coder resources (assigned by the SMSC) and a traffic channel communicating with the mobile unit. The BMSC sends an intersystem setup response message to the SMSC, indicating the packet link is established and when the mobile unit answers, the SMSC connects the incoming call to the packet link.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
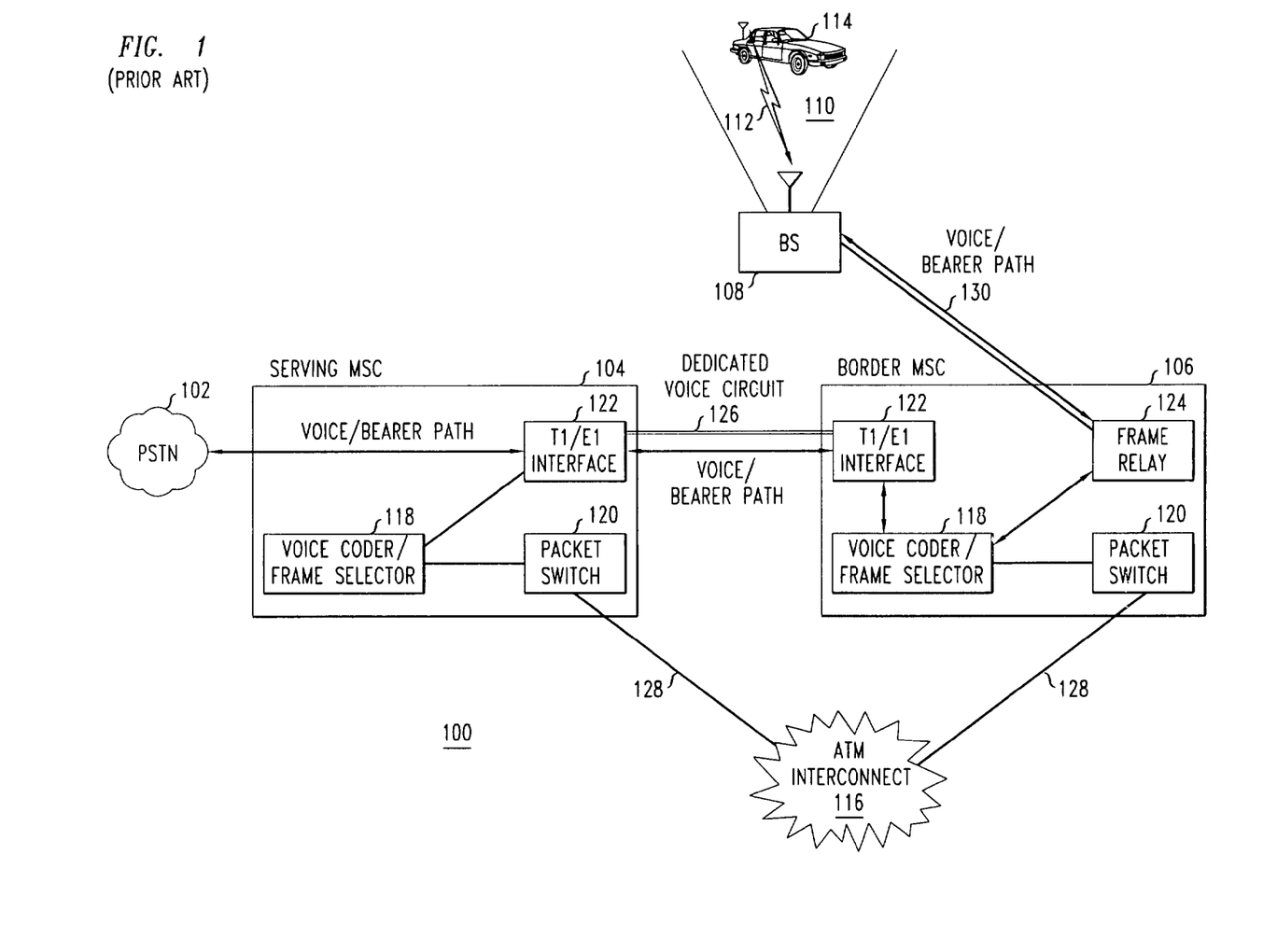
FIG. 1 is a block diagram of a communication system illustrating a border cell scenario according to the prior art in which a call is delivered to a border cell via a dedicated voice circuit.

Turning now to the drawings and referring initially to FIG. 1, there is shown a communication system 100 illustrating a border cell scenario according to the prior art. The communication system 100 comprises a telephone network (as shown, the public switched telephone network (PSTN) 102) connected to a serving MSC ("SMSC") 104. The SMSC 104 is in proximity to a border MSC ("BMSC") 106. The SMSC and BMSC are each connected to one or more base stations 108 (one shown) providing telecommunication and other services to mobile units roaming within respective geographic regions 110, defining respective "cells" or "cell sectors." (As used herein, the term "border cell" or "border MSC" refers to a cell/MSC that is within roaming distance of the serving cell/SMSC but need not be directly adjacent to (or "bordering") the serving cell/SMSC.)

In the border cell scenario, the PSTN 102 is the source of an incoming call directed to a mobile unit believed to be in the range or geographic region of the SMSC 104, but the mobile unit in fact has roamed to a border cell controlled by the BMSC 106. To best illustrate the border cell scenario, only a single mobile unit 114 is shown, residing in the border cell 110 controlled/served by the BMSC 106. For purposes of the present example, it is presumed mobile unit 114 is the target of an incoming call routed from the PSTN 102 to the SMSC 104. (As shown, an arrow termed "voice/bearer path" denotes the path of the incoming call).

The incoming call in the border cell scenario may comprise, without limitation, a voice, video and/or data call, electronic mail, paging service, short message service, electronic commerce, location service or packet data service originating from the PSTN 102. Within the PSTN 102, the source of the call may comprise, by way of example and not limitation, a wireless or wireline telephone, fax machine, personal digital assistant (PDA), computer and the like. The targeted mobile unit 114 may comprise, without limitation, a cellular radio/telephone, laptop computer, two-way radio, PDA and the like. As is well known, the PSTN 102 provides call control, coding and switching functionality to route the incoming call to the SMSC 104.

The call is directed to the SMSC 104 because at the time of call delivery from the PSTN, the mobile unit 114 is believed to served by the SMSC 104. This may occur, for example, if the mobile unit 114 is registered with the SMSC 104 and has not yet re-registered with the BMSC 106. As is well known, HLR/VLR databases (not shown) are maintained by the communication system 100 to track the location of mobile units within respective regions. In the border cell situation, the HLR/VLR data indicates that the mobile unit is being served by the SMSC 104. The communication system 100 relies upon the HLR/VLR data to determine the location of the targeted mobile unit and, hence directs the incoming call from the PSTN to the SMSC 104.

Generally, wireless communication is made possible by converting the format of the incoming call to a wireless protocol. Using such protocol, the mobile unit 114 communicates with the base station 108 via RF resources 112. Example wireless protocols include, for example, Code Division Multiple Access (CDMA), Time Division Multiple Access (TDMA), Global System for Mobile Communications (GSM), General Packet Radio Service (GPRS), Advanced Mobile Phone Service (AMPS) and Universal Mobile Telecommunications System (UMTS). It is presumed for purposes of example but not limitation that the communication system 100 uses a CDMA protocol. Accordingly, in the present example, the RF resources 112 comprise code division modulated signals and the SMSC 104, BMSC 106 and base station 108 are equipped with suitable hardware, software and processing functionality to process CDMA calls to the mobile unit 114. In the case of the SMSC 104 and BMSC 106, these resources include voice coder and frame selector resources 118 adapted for processing CDMA calls.

The SMSC 104 and BMSC 106 further include respective packet switches 120, T1/E1 interfaces 122 and frame relay interface 124 (one shown). The packet switches 120 are connected by links 128 to an ATM interconnect network 116 (as typical in CDMA networks). The T1/E1 interfaces 122 connect the SMSC 104 and BMSC 106 to a dedicated voice circuit 126 (typically a T1 or E1 link). The frame relay interface 124 connects the BMSC 106 to a frame relay link 130 (as typical in CDMA networks) between the BMSC 106 and base station 108.

Upon receiving the incoming call, the SMSC 104 pages the mobile unit 114 and, because the mobile unit 114 has now roamed to an area associated with the BMSC 106, the mobile unit does not respond to the page. The SMSC 104 interprets the lack of response to determine that the mobile unit 114 is no longer within the range of the SMSC 104. The SMSC 104 does not yet know the actual location of the mobile unit 114. In attempt to determine the location of the mobile unit 114, the SMSC 104 sends an intersystem paging request to the BMSC 106. Responsive to the intersystem paging request, the BMSC 106 pages the mobile unit 114. The mobile unit 114 responds to the page, thereby indicating to the BMSC 106 that the mobile unit 114 is within control of the BMSC 106. The BMSC 106 then sends to the SMSC 104 an intersystem paging response message, indicating to the SMSC 104 that the mobile unit 114 is being served by the BMSC 106. The intersystem paging request and intersystem paging response are preferably compatible with the ANSI-41 protocol promulgated by the American National Standards Institute.

Responsive to the intersystem paging response, the SMSC 104 allocates a dedicated voice circuit 126 to provide an intermediate link for the incoming call to the BMSC 106. The SMSC 104 sends to the BMSC 106 an intersystem setup request message (also ANSI-41 compatible) to indicate the identity of the voice circuit 126 used for the intermediate call delivery. The BMSC 106 provides voice coder and frame selector resources for the call. The BMSC 106 then establishes a connection to the base station 108 and links the dedicated voice circuit 126 to the base station connection.

More particularly, as shown, the incoming call is routed from the T1/E1 interface 122 to block 118 of the BMSC. The BMSC reserves or designates a packet address at block 118 (commonly referred to as a data link connection identifier ("DLCI")) identifying the voice coder resources to be used for the call. The BMSC communicates the DLCI to the base station 108, thereby establishing a packet link 130 whereby the base station 108 may deliver packets to the BMSC having the DLCI as an address or header, and the BMSC will process the packets using the voice coder and frame selector resources associated with the DLCI.

In summary, therefore, according to the prior art communication system 100 shown in FIG. 1, a dedicated voice circuit 126 is relied upon to route an incoming call to the mobile unit 114 in a border cell scenario. The call setup appears as a call delivery followed by an intersystem hard handoff, whereby the BMSC of the border cell (where the mobile unit 114 is actually located) establishes voice coder and frame selector speech processing resources for the call. As will be described in greater detail in relation to FIG. 2, an embodiment of the present invention accommodates the border cell scenario in a communication system 200 using packet-based links, i.e., without relying upon dedicated voice circuit(s) between SMSC and BMSC. The call setup has the appearance of an intersystem soft handoff followed by a primary cell transfer, whereby voice coder and frame selector speech processing resources for the call are established by the serving MSC (where the mobile unit is first believed to be located).

Figure 2:
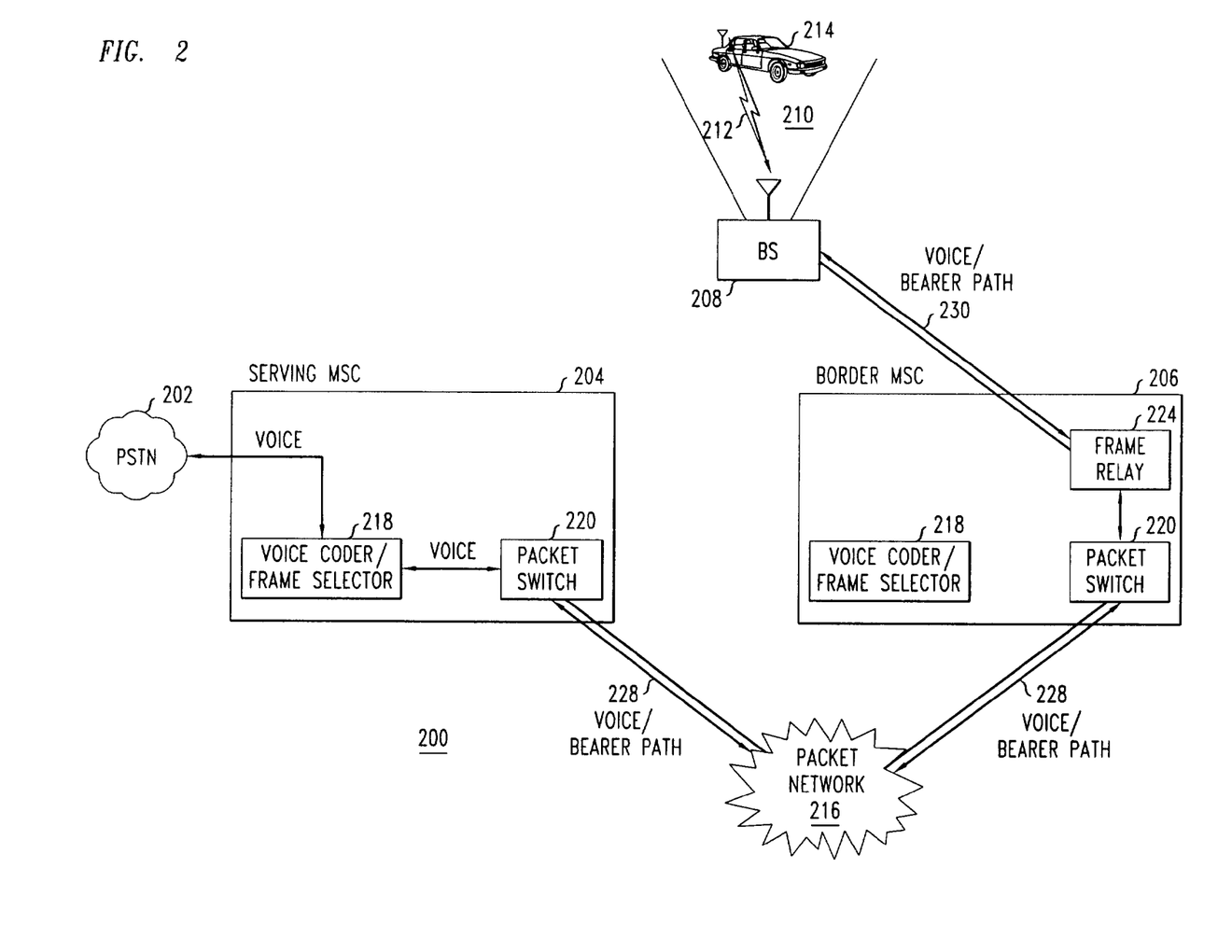
FIG. 2 is a block diagram of a communication system illustrating a border cell scenario according to one embodiment of the present invention in which a call is delivered to a border cell via a packet network.

Referring to FIG. 2, the communication system 200 comprises a serving MSC ("SMSC") 204 in proximity to a border MSC ("BMSC") 206. The SMSC and BMSC are each connected to one or more base stations 208 (one shown) providing telecommunication and other services to mobile units roaming within respective geographic regions 210, substantially as described in relation to FIG. 1.

In the border cell scenario, the PSTN 202 is the source of an incoming call directed to a mobile unit 214. The incoming call is first directed to the SMSC 204 (where the mobile unit 214 is believed to be located) but the mobile unit has roamed to the coverage area of base station 208 of BMSC 206. The mobile unit 214 communicates with the base station 208 via RF resources 212. The incoming call may comprise, without limitation, a voice, video and/or data call, electronic mail, paging service, short message service, electronic commerce, location service or packet data service originating from the PSTN 202. The source of the incoming call may comprise, without limitation, a wireless or wireline telephone, fax machine, personal digital assistant (PDA), computer and the like; and the targeted mobile unit 214 may comprise, without limitation, a cellular radio/telephone, laptop computer, two-way radio, PDA and the like.

For purposes of example but not limitation, it is presumed the base station 208 and mobile unit 214 communicate using CDMA protocol. Accordingly, in the present example, the RF resources 212 comprise code division modulated signals and the SMSC 204, BMSC 206, base station 208 and mobile unit 214 are equipped with suitable hardware, software and processing functionality to process CDMA calls. In the case of the SMSC 204 and BMSC 206, these resources include voice coder and frame selector resources 218. As will be appreciated, however, protocols other than CDMA (including but not limited to TDMA, GSM, GPRS, AMPS and UMTS) may also be used.

The SMSC 204 and BMSC 206 further include respective packet switches 220 and frame relay interface 224 (one shown). The packet switches 220 are connected by links 228 to a packet network 216. To achieve greatest cost savings/benefits, the packet network 216 preferably comprises a pre-existing packet network such as an ATM interconnect network typical in CDMA networks. Generally, however, the packet network 216 may comprise virtually any type of network, new or pre-existing, that supports a packet-based protocol such as, for example, internet protocol (IP), ATM or frame relay. The frame relay interface 224 connects the BMSC 206 to a frame relay link 230 (as typical in CDMA networks) between the BMSC 206 and base station 208. Alternatively, the BMSC 206 and base station 208 may be connected by IP, ATM or circuit-switched links.

As has been noted, the communication system 200 does not rely upon dedicated voice circuit(s) between SMSC and BMSC. Hence, no such dedicated voice circuits or T1/E1 interfaces are shown in FIG. 2.

Figure 3A:
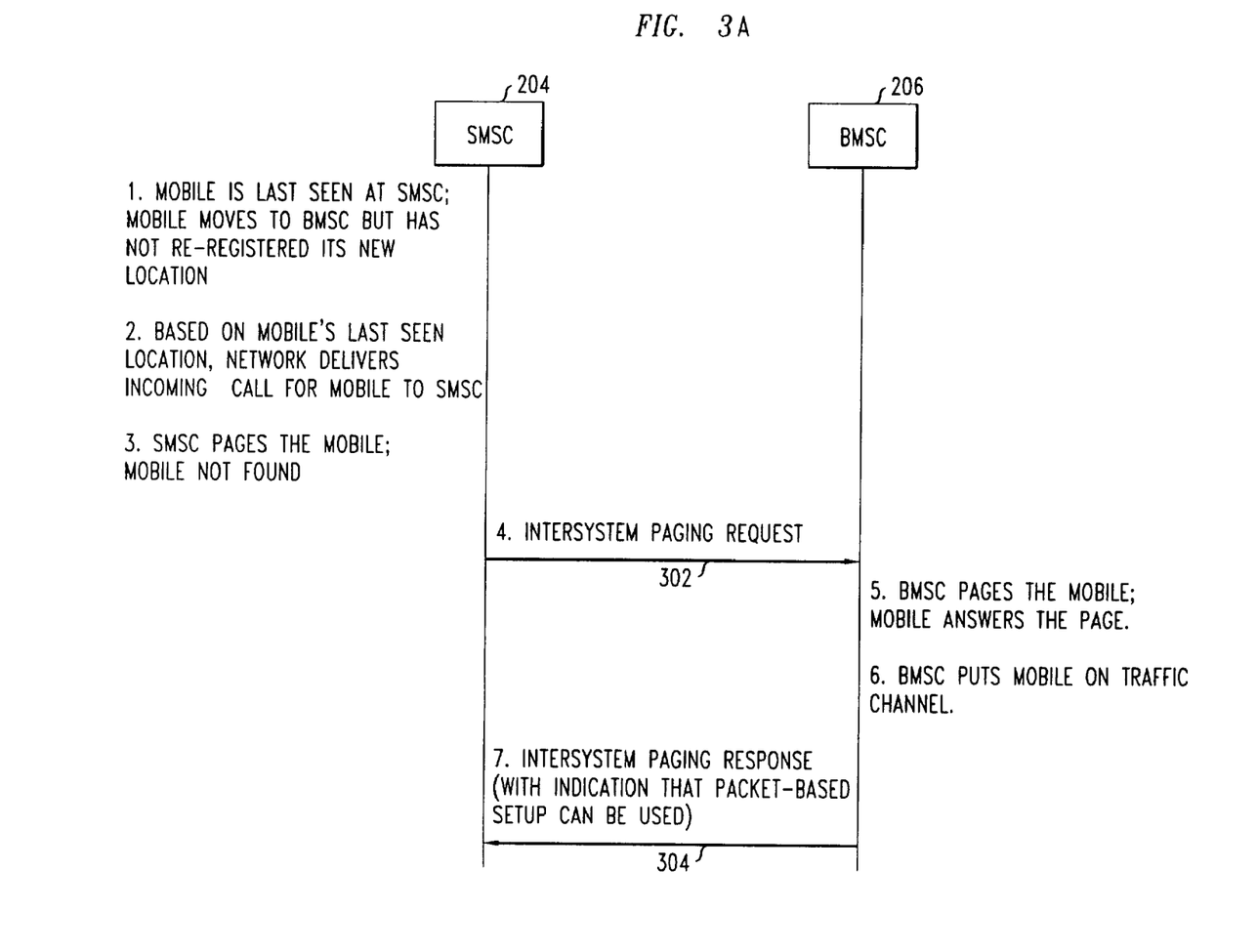
FIG. 3 is a message sequence chart showing ANSI-41 messages exchanged between SMSC and BMSC in a border cell situation according to one embodiment of the invention.
Figure 3B:
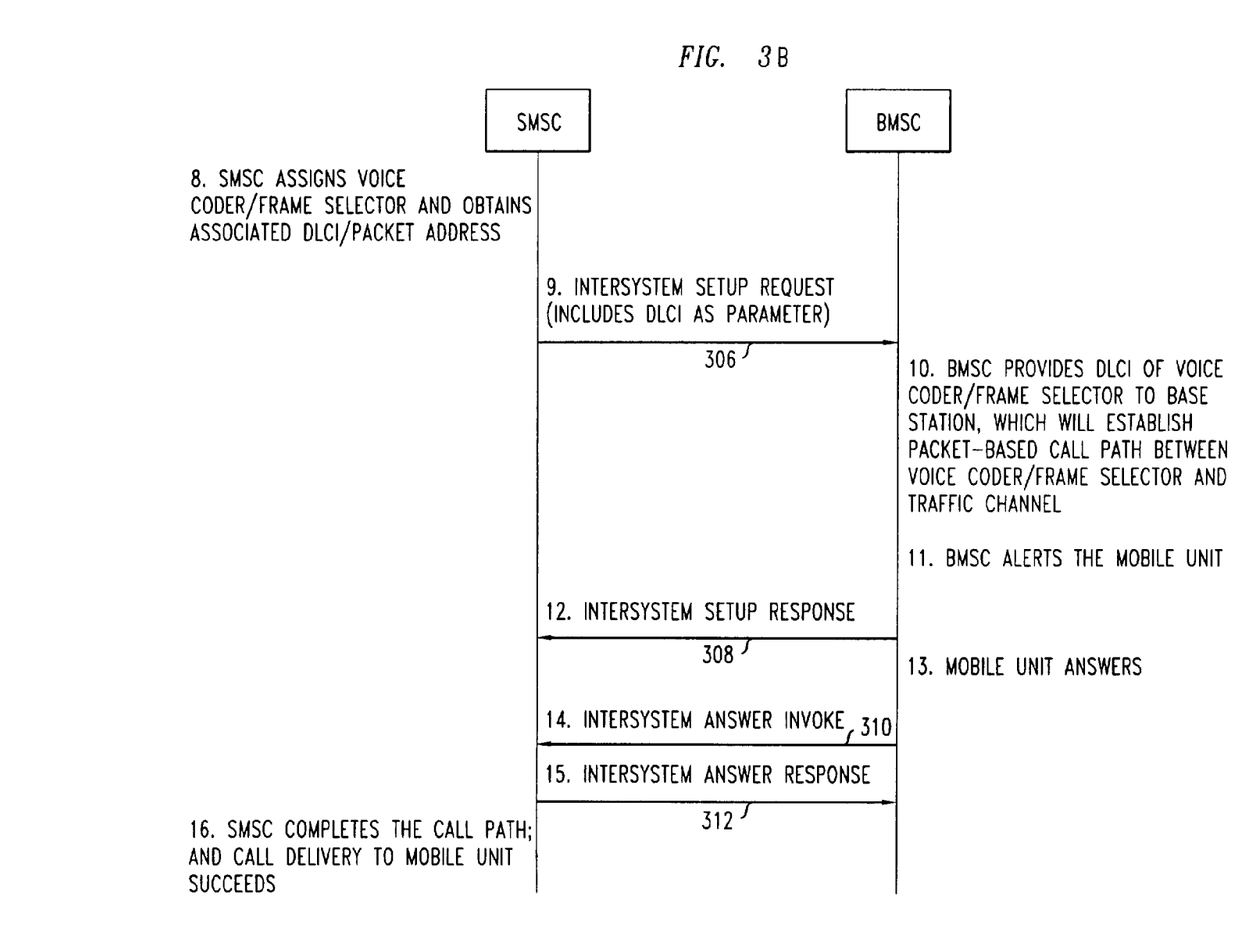
Figure 4:
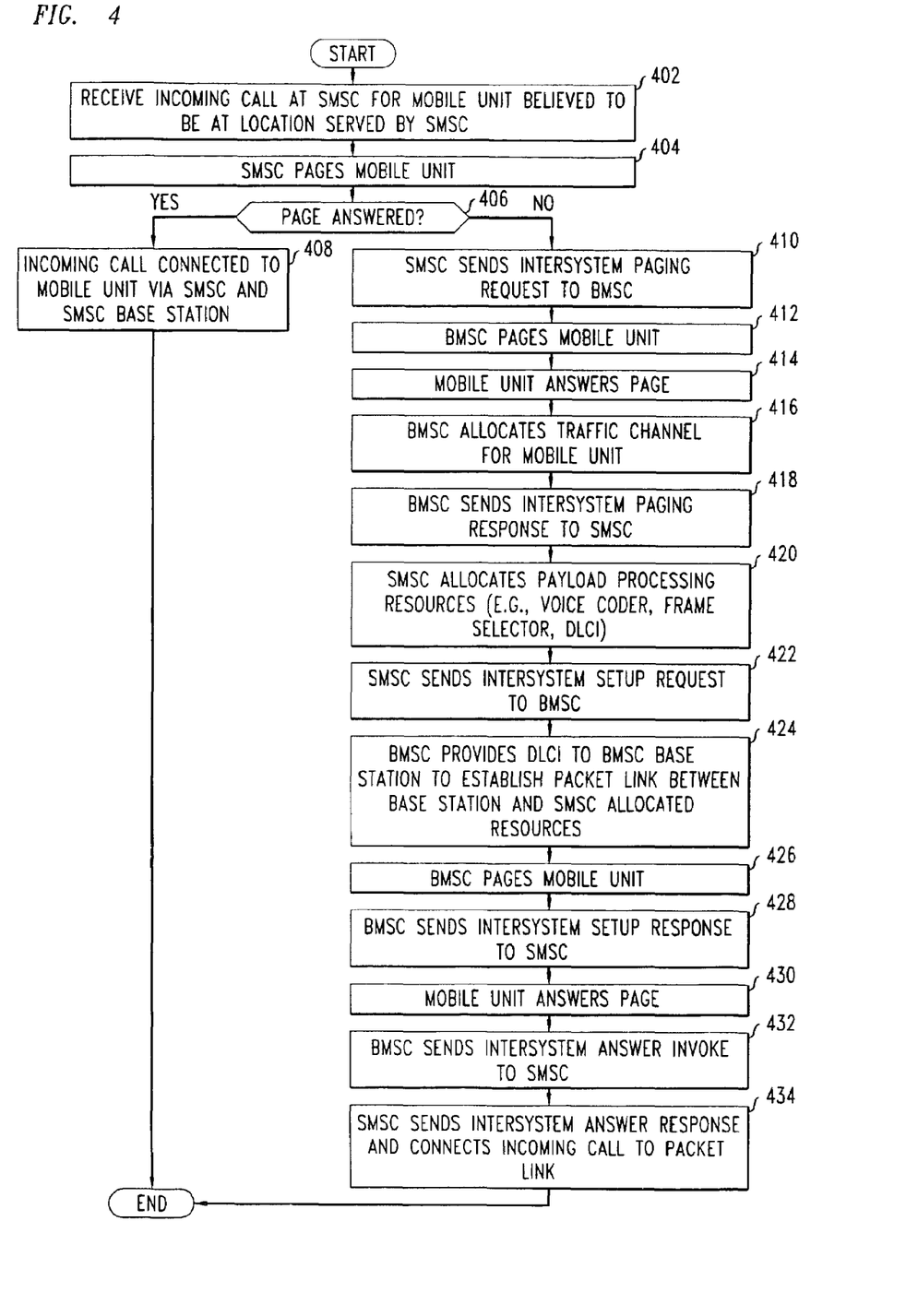
FIG. 4 is a flowchart of a method for connecting an incoming call to a border cell using a packet network according to one embodiment of the invention.

FIG. 3 and FIG. 4 show a message sequence and method, respectively, for delivering an incoming call to a mobile in a border cell using a packet network in a communication system of the type shown in FIG. 2. For convenience, the method (FIG. 4) and message sequence (FIG. 3) will be described substantially concurrently. The steps of FIG. 4 and the messages of FIG. 3 are implemented, where applicable, using stored software routines within the SMSC 204, BMSC 206, base station 208 and/or mobile unit 214 of the communication system 200.

Referring initially to FIG. 4, the method begins at step 402, where the SMSC 204 receives an incoming call for a mobile unit (e.g., mobile unit 214) believed to be in an area served by the SMSC 204. The SMSC 204 pages the mobile unit at step 404 and waits a predetermined period of time for a response, as known in the art. If the page is answered, determined at step 406, the mobile unit is in fact within an area served by the SMSC 204 (i.e., communicating with an SMSC base station (not shown)) and the SMSC 204 terminates or connects the call to the SMSC base station at step 408 in conventional fashion. If, however, the page is not answered (or at least not communicated to the SMSC), the SMSC 204 determines that the mobile unit is no longer within the range of the SMSC. The SMSC 204 does not yet know the actual location of the mobile unit.

In attempt to determine the location of the targeted mobile unit 214, the SMSC sends at step 410 an intersystem paging request 302 to the BMSC 206. At step 412, responsive to the intersystem paging request 302, the BMSC 206 pages the mobile unit 214. The mobile unit 214 answers the page at step 414, thereby indicating to the BMSC 206 that the mobile unit 214 is within control of the BMSC 206. Next, at step 416, the BMSC 206 allocates a traffic channel for the mobile unit 214. That is, the BMSC 206 reserves RF resources 212 between the base station 208 and the mobile unit 214 to support the incoming call. Then, at step 418, the BMSC 206 sends to the SMSC 204 an intersystem paging response message 304, indicating that the mobile unit 214 is being served by the BMSC 206 and that a packet-based setup can be used. The intersystem paging request 302 and intersystem paging response 304 are preferably compatible with the ANSI-41 protocol promulgated by the American National Standards Institute.

Upon receiving the intersystem paging response 304, the SMSC at step 420 allocates payload processing resources (e.g., voice coder, frame selector, DLCI) for the call. More particularly, the SMSC uses block 218 (FIG. 2) to reserve or designate a packet address (or DLCI) identifying the voice coder resources to be used for the call. Next, at step 422, the SMSC sends an intersystem setup request 306 to the BMSC 206. In the preferred embodiment, the intersystem setup request 306 includes the DLCI as a parameter, thus indicating to the BMSC 206 that the SMSC 204 has assigned payload processing resources for the call.

At step 424, the BMSC 206 provides the DLCI (received from the SMSC) to the BMSC base station 208. The base station 208 uses the DLCI to establish a packet-based call path via packet links 230, 228, to the voice coder/frame selector block 218 of SMSC. The packet-based call path thereby defines a voice/bearer path between SMSC allocated resources (e.g., voice coder/frame selector resources of SMSC) and BMSC allocated resources (e.g., traffic channel of base station 208).

At step 426, the BMSC 206 alerts (i.e., rings) the mobile unit 214. At step 428, the BMSC 206 sends to the SMSC 204 an intersystem setup response message 308, thereby informing the SMSC 204 that the BMSC 206 has set up the voice path from the SMSC allocated resources to the BMSC allocated resources. At step 430, the mobile unit 214 answers the call, as is well known in the art, by pressing a "send" button or other means. At step 432, the BMSC 206 sends an intersystem answer invoke message 310 to the SMSC 204, thereby informing the SMSC 204 that the mobile unit 214 has answered the call. Then, at step 434, the SMSC 204 sends an intersystem answer response 312 to the BMSC 206 to acknowledge the answer of the mobile unit. The SMSC 204 then connects the incoming call to the packet link at the voice coder/frame selector block 218, thereby completing the call path to the mobile unit.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system including a plurality of mobile switching centers, wherein an incoming call is received for a mobile unit at a serving mobile switching center (SMSC) of the plurality of mobile switching centers and the mobile unit is determined to be Within a location served by a border mobile switching center (BMSC) of the plurality of mobile switching centers, the SMSC defining mobile switching center where the mobile unit is registered and believed to be located and the BMSC defining a mobile switching center where the mobile unit is located but not registered, a method comprising:
    allocating processing resources for the incoming call at the SMSC, thereby defining SMSC allocated resources;
    allocating traffic channel resources for the mobile unit at the BMSC, thereby defining BMSC allocated resources;
    establishing a packet link between the SMSC allocated resources and the BMSC allocated resources; and
    connecting the incoming call to the packet link, thereby connecting the mobile unit to the incoming call.

2. The method of claim 1, wherein the step of allocating processing resources comprises allocating voice coder resources for the call at the SMSC.

3. The method of claim 1, wherein the step of allocating traffic channel resources comprises establishing an air interface between the mobile unit and a base station operably connected to the BMSC.

4. The method of claim 3, wherein the step of establishing a packet link comprises:
    sending, from the SMSC to the BMSC, an intersystem setup request including a data link connection identifier (DLCI) defining a packet address of the SMSC allocated resources;
    sending the DLCI from the BMSC to the base station, the base station using the DLCI to establish the packet link; and
    receiving, by the SMSC from the BMSC, an intersystem setup response indicating that the packet link is established.

5. The method of claim 4, wherein the intersystem setup request and the intersystem setup response comprise ANSI-41 compatible messages.

6. The method of claim 1, wherein the step of establishing a packet link comprises establishing an asynchronous transfer mode (ATM) protocol link.

7. The method of claim 1, wherein the step of establishing a packet link comprises establishing an internet protocol (IP) link.

8. The method of claim 1, wherein the step of establishing a packet link comprises establishing a frame relay protocol link.

9. A method for setting up an incoming call directed to a mobile unit, wherein the mobile unit has roamed from a first base station coverage area, associated with a base station controlled by a serving mobile switching center (SMSC), to a border base station coverage area, associated with a base station controlled by a border mobile switching center (BMSC), the SMSC defining mobile switching center where the mobile unit is registered and believed to be located and the BMSC defining a mobile switching center where the mobile unit is located but not registered, the method comprising:
    sending an intersystem setup request message from the SMSC to the BMSC, the intersystem setup request message including a data link connection identifier (DLCI) indicating a packet address of voice coder resources assigned by the SMSC for the incoming call;
    sending the DLCI to the base station controlled by the BMSC, the base station having established a traffic channel for communicating with the mobile unit, the base station thereby establishing a packet link between the packet address of the voice coder resources and the traffic channel;
    sending an intersystem setup response message from the BMSC to the SMSC, the intersystem setup response message indicating the packet link is established; and
    connecting, by the SMSC, the incoming call to the packet link.

10. The method of claim 9, wherein the intersystem setup request and the intersystem setup response comprise ANSI-41 compatible messages.

11. The method of claim 9, wherein the packet link comprises an asynchronous transfer mode (ATM) protocol link.

12. The method of claim 9, wherein the packet link comprises an internet protocol (IP) link.

13. The method of claim 9, wherein the packet link comprises a frame relay protocol link.

14. A communication system comprising:
    a serving mobile switching center (SMSC) defining a mobile switching center where a mobile unit is registered and believed to be located, the SMSC operable to determine, upon receiving an incoming call for a mobile unit, that the mobile unit has roamed outside an area served by the SMSC, the SMSC including a voice coder adapted for allocating voice processing resources for the incoming call;
    a border mobile switching center (BMSC) defining a mobile switching center where the mobile unit is located but not registered, the BMSC operable to determine, responsive to a query of the SMSC, that the mobile unit is within an area served by the BMSC, and to inform the SMSC that the mobile unit is within an area served by the BMSC;
    a base station connected to the BMSC for providing a wireless link to the mobile unit; and a packet network for providing a packet link between the SMSC and BMSC, the packet link being established responsive to the SMSC sending a packet address of the voice coder to the BMSC, and the BMSC sending the packet address to the base station.

15. The system of claim 14, wherein the packet link comprises an asynchronous transfer mode (ATM) protocol link.

16. The system of claim 14, wherein the packet link comprises an internet protocol (IP) link.

17. The system of claim 14, wherein the packet link comprises a frame relay protocol link.

* * * * *